United States Patent
Forbes, Jr.

[11] 3,866,524
[45] Feb. 18, 1975

[54] VEHICLE WINDOW VENTILATOR
[76] Inventor: Hampton E. Forbes, Jr., 2013 Oak St., Wilmington, Del. 19808
[22] Filed: May 11, 1973
[21] Appl. No.: 359,455

[52] U.S. Cl. ............................................. 98/2.13
[51] Int. Cl. ............................................. B60h 1/24
[58] Field of Search ..................... 98/2.12, 2.13

[56] References Cited
UNITED STATES PATENTS
2,034,528   3/1936   Ozkes ................................ 98/2.13

Primary Examiner—Meyer Perlin

[57] ABSTRACT

A vehicle window ventilating device adapted for present day style windows comprises a slotted flange extension for the window opening of a vehicle. In one form, the slotted flange extension comprises a simple extension of the conventional flange presently provided around vehicle window apertures, and against which the window seats, for controlling the engress and egress of air and water through the window opening, and in another embodiment, the slotted flange extension comprises an accessory element having at least two angularly related sections. In the latter case, one section of the slotted flange extension element is attached to the vehicle window opening along both the rearwardly inclined front portion and the upper portion thereof, and the second section of the flanged extension element extends into the window opening aperture to reduce the apparent size thereof. However, both the second section of the flanged extension element and the simple extension of the conventional window flange each include a slotted part which slotted part is located along the inclined front portion of said window opening, thereby providing a ventilating slot along the inclined front portion of said window opening when the window member is partially lowered within the window opening.

5 Claims, 9 Drawing Figures

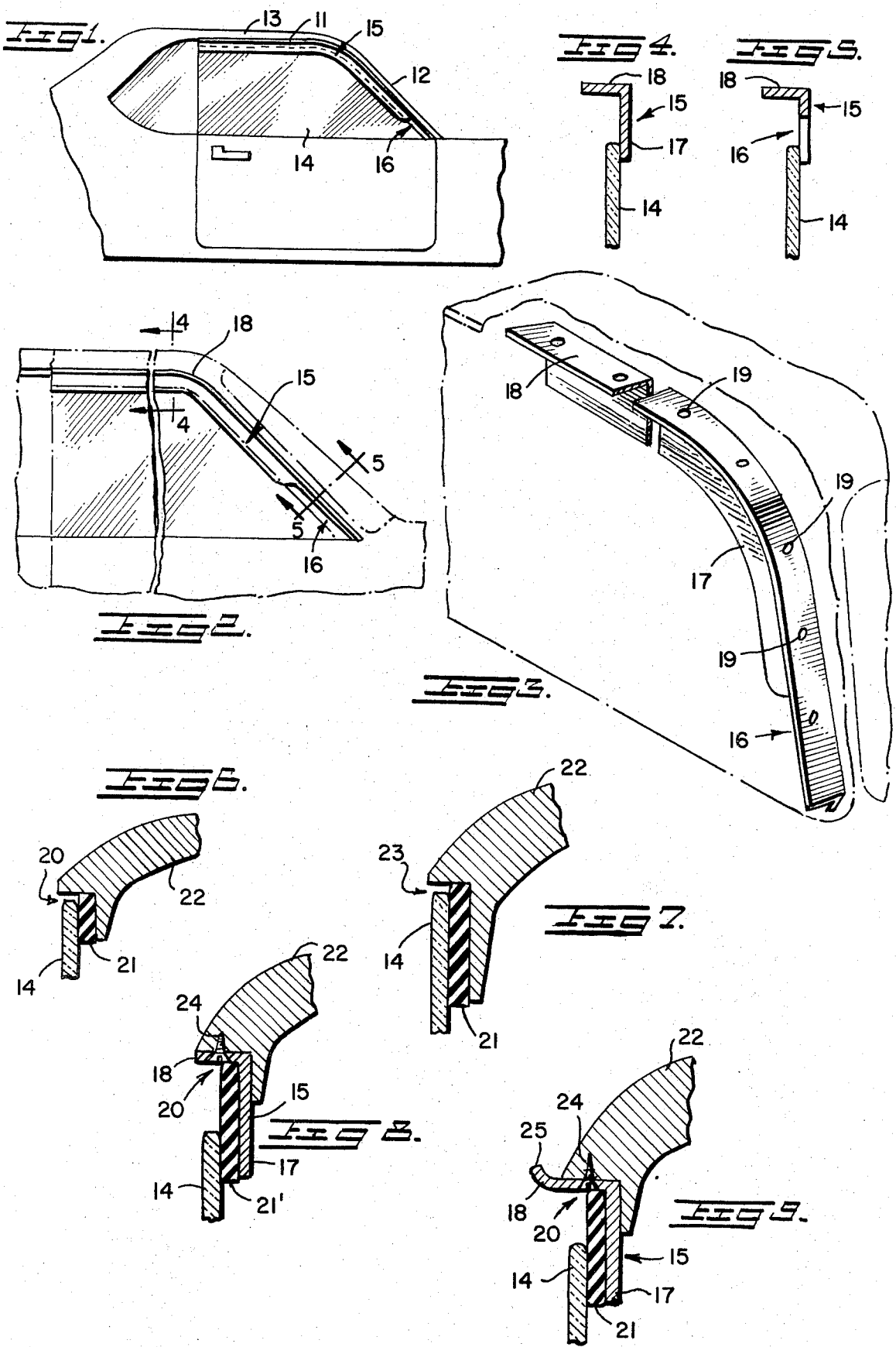

VEHICLE WINDOW VENTILATOR

SUMMARY OF INVENTION

The present invention relates generally to the art of air extraction and more particularly to the extraction of air from around the windows of moving vehicles such as automobiles. Thus the principal object of the invention is to provide a means, which acts in cooperation with the air outside of a vehicle and is effective through a relative motion of said vehicle through the outside air, to cause an extraction of air from within the vehicle.

Another object of the present invention is to provide a ventilating device either as a part of or removably attached to the window opening of a vehicle, such as an automobile and which does not interfere with the normal operation of the window, so that the latter may act in combination with the ventilating device as a regulating means for the purpose of regulating the amount of air extracted from the automobile.

Yet another object of the present invention is to provide an efficient and simple means for ventilating a vehicle that is of simple construction and of such design that it does not detract from the appearance of the vehicle body to which it is applied.

The ventilating means of the present invention is adaptable to the frameless windows found on pillarless vehicles commonly known as hardtop convertibles. Specifically, the ventilating device of the present invention was developed for use on the window openings of automobiles having no front quarter window vents. The automobile industry began to eliminate the front quarter window vents from the front vindows of automobiles on most models in 1969, when both the United States and foreign automobile manufacturers decided that the extra quarter window glass, frame and mechanical opening closing and locking mechanisms were not required. Presumably the elimination of the front quarter window vents was predicated on the installation of other forced air and extractor type of ventilating means within the automobile. However, as a practical matter, the replacement devices either were inefficient or did not function properly and automobile owneres have had to continue to lower the windows of their automobiles to achieve adequate ventilation. Accordingly, the present invention relates either to a modification of the front automobile window openings as presently manufactured, or to an attachment which is adaptable for frameless front side windows of automobiles, wherein a ventilating slot is provided in approximately the same location as the previously removed front quarter vent windows. Thus the windows being ventilated with the device of the present invention are located wholly within the front door of a typical automobile wherein they may be raised or lowered.

The front door glass presently being used by most automobile manufacturers is generally slightly curved from top to bottom, and has a rearwardly inclined front portion starting at the extreme front lower edge from which the glass tapers back at approximately 45° to a top portion which is substantially horizontal. The top portion of the glass may be confined to the side of the automobile or it may extend into the top of the automobile body depending upon the style and model. The rear edge of the glass is generally vertical and meets the top of the glass at approximately 90°.

In the preferred embodiment, the flange, in whatever position or style used, should extend inside the framed window opening to partially reduce the size thereof and the recessed or slotted area of the flange extension is preferably located at or near the position the previously used front quarter vent window would have occupied. Thus the flanged extension of the present invention may take the form of a simple extension of the window frame itself, or it may be formed as an accessory unit as described above, constructed from any desired material, but preferably in the form of an extrusion of metal, plexiglass or some other synthetic material, properly shaped to fit the desired window frame opening.

The present invention is adaptable to be incorporated on hard top type automobiles where no door provided window frame or center post is available for supporting the window glass. In the frameless window constructions employed by most new car manufacturers, the door glass windows when raised to their uppermost position are closed against a window aperture located in the side and partially in the roof area of the automobile. The window glass is sealed against the window aperture by a partial flange of weather stripping material located generally along the inclined forward edge and uppermost edge of the glass, In some car models, where there is a centrally located roof supporting pillar, the window opening also includes weather stripping material at the rearmost edge of the window, however for the purposes of the present invention, the only part of the window opening that is deemed critical is the inclined forward edge and the uppermost edge.

Thus for use on the frameless windows described above, one form of the present invention comprises an extension of the partial flange and weather stripping material that is normally applied to the upper portion and inclined front portion of the window opening. Accordingly, the extension of the partial flange would project into the window aperture area to reduce the apparent size thereof except along a section of the inclined front portion of the window opening wherein a part of the extension would be recessed or reduced to its original partial size to provide the desired ventilating slot. Hence when the window was lowered slightly within the window opening described above, the recessed or reduced in size portion of the flanged extension would be uncovered thereby permitting ventilation of inside air from within the moving automobile, while the remaining part of the window opening would still remain sealed against air loss or egress because of the presence of the flanged extension.

In the preferred embodiment for both the framed window and the frameless window, the recessed or reduced in size portion of the flanged extension is located at or near the extreme front lower edge of the window opening and the shape of the reduced in size portion of the flanged extension is compatible with the inclined angle of the window opening and the glass. For instance, for a window opening having an inclined front portion of approximately 45°, a vent opening of about 0.706 inch would be available when the window glass was lowered 1.0 inch.

Alternatively the flanged extension for use on frameless window constructions could be in the form of an accessory add-on unit in the form of an extrusion of metal, plexiglass or some other synthetic material consisting of two angularly related sections. The first section would be attached to the window opening and the second section would include the recessed or reduced in size portion and would extend into and partially reduce the apparent size of the window opening area when installed. Thus the flanged extension of the present invention could easily be manufactured as an accessory for automobiles produced after the front quarter vent window was eliminated. Moreover, obviously the flanged extension described herein could be added to automobiles presently being produced as either standard equipment or an option. In this regard, and particularly as shown in the drawing herein, the standard sized flange area or weather stripping employed by new car manufacturers could be increased in size along the top and a part of the inclined front portion thereof, while leaving the standard width in the area of the missing front quarter vent window to provide the same effective slotted vent area achieved with the accessory unit.

As shown in the drawing, the flanged extension could also be provided with yet another extended portion to provide a water deflecting channel for the window opening. Clearly the novelty of the present invention lies in its functional simplicity wherein a working ventilating means is achieved for the front window opening of an automobile, without adding extra opening, closing and locking means for an additional panel of glass. As described, the same mechanical elements which coact to raise and lower the window vertically also serve to produce the ventilating function. In addition, the preferred location of the vent at the forward, inclined edge of the window opening also reduces the risk of pilferage, especially when the door lock and latch are located at the rear of the window opening.

The ventilating system provided herein creates an exhaust effect through an opening formed by the slotted area of the flanged extension and the partially lowered window that is as large as the size of the slotted, or reduced in width portion of the flanged extension. Generally this opening is rhomboidal in shape with the size of the slotted area being controlled by lowering and raising the window. Thus the vent area can be adjusted from very slight up to the maximum size of the reduced in width section of the flanged extension without also creating an intake at the top area of the window opening. The location and length of the vent area remains the same at all times with the width of the vent area varying as the window is lowered and closed.

DESCRIPTION OF DRAWING

FIG. 1 is a partial view of an automobile showing the present day style window opening with the ventilating flange of the present invention attached thereto;

FIG. 2 is an enlarged view (partially broken to reduce the size thereof) of the ventilating flange member of the present invention;

FIG. 3 is a perspective view of the ventilating flange member shown in FIG. 2;

FIG. 4 is a cross sectional view through the lines 4—4 of FIG. 2 showing the window overlapping the ventilating flange;

FIG. 5 is a cross sectional view through the lines 5—5 of FIG. 2 showing the ventilating slot created between the ventilating flange and the partially lowered window;

FIG. 6 is a partial cross section of a typical automobile roof showing how the window is sealed in the window aperture;

FIG. 7 is a view similar to FIG. 6 showing how the top and a part of the inclined front portion of the window flange would be changed according to the invention;

FIG. 8 is a view similar to FIG. 6 showing how an accessory ventilating flange could be installed in a typical automobile window aperture; and, FIG. 9 shows a modification of the ventilating flange of FIG. 8.

DETAILED DESCRIPTION

The window ventilating device of the present invention is adaptable for windows of the frameless variety. For the frameless windows, the flanged extension could be either a substitute for, or an added part of the weather stripping material normally applied to the upper portion and inclined front portion of the window opening. Of course, the flanged extension element which extends into the window opening aperture also includes a reduced in width part which provides the vent opening as before. Thus it may be seen that the novelty of the present invention lies in its functional simplicity.

Referring now more particularly to the drawings, FIG. 1 illustrates an example of a typical present day style automobile body 10 with a side window construction including a window opening 11 having a rearwardly inclined front portion 12 and a substantially horizontally disposed upper portion 13. In the example shown in FIG. 1, the automobile is more commonly referred to as a hardtop convertible with no roof support pillar at the rear of the window 14 and no frame around the window. It will also be seen with further reference to FIG. 1 that the novel ventilating flange element 15 disclosed herein includes the reduced in width portion 16 illustrated at the lower foward end of the window opening 11. Note further in FIG. 1 that the window 14 is partially lowered within the window opening, and while the window 14 still overlaps the flange extension 15 along the top and a part of the front thereof, the slotted area 16 is in fact uncovered to permit the desired interior ventilation.

FIG. 2 illustrates an enlarged view of the flange element 15 attached to the window opening 11 of an automobile having frameless windows. It will also be noted in FIG. 2 that with the window 14 partially lowered within the window opening 11, the front vent area 16 of the flange extension 17 is uncovered, while the remainder of the window 14 still overlaps the flange extension 17 preventing any chances of a draft occurring either along the upper edge of the window 14 or along the unvented portion of the inclined front edge of the window opening.

FIG. 3 shows in perspective an isolated view of the flange element 15 of the present invention designed for use on a frameless window. The flange element consists of a first section 18 which is attached to the window aperture via screws or the like passing through the holes 19 provided therefor. Basically the frame element 15 is in the shape of a boomerang and consists of the first flange extension 18 and a second extension 17 at substantially right angles to the first extension. The second extension 17 projects into the window opening when mounted in position and it includes the slotted area 16 for providing the ventialting slot. Thus for the accessory unit illustrated in FIG. 3 the slotted area 16 consists essentially of a reduced in size portion of the second extension 17 in the region of the lower front curved thereof. Accordingly, with the accessory unit 15 mounted in the window aperture of a vehicle having frameless windows, as the window is lowered within the aperture, the slotted area at 16 becomes uncovered while the remainder of the window is still overlapped by the second extension 17. In this manner a ventilating slot is created in the region the front quarter vent window would normally occupy substantially as shown in FIG. 2. FIGS. 4 and 5, taken at the top of the window aperture of FIG. 2 and in the region of the slotted area 16 of FIG. 2, respectively, illustrate the operating principle just described. It is important of course, for the ventilating slot 16 to be uncovered while maintaining a seal around the rest of the window 11 because the purpose of the present invention is to achieve an effective evacuation of air from within the moving vehicle while at the same time no additional air is desired to be admitted around the top of the window. In the vehicle designs presently being manufactured, wherein there is no front quarter vent window, when one lowers the glass within the window aperture to achieve ventilation from a moving vehicle, a slot is produced both at the front and the top of the window. And the slot thus formed while being effective for the sake of exposing a low pressure area at the front of the window, also uncovers a high pressure area at the top of the window which admits air into the moving vehicle. On the other hand, with the invention described herein, lowering of the window effectively exposes the low pressure area at the front portion of the window while the top of the window remains sealed against the engress of air. Clearly the invention described herein achieves its desired purpose in a simple manner while taking advantage of the atmospheric conditions existing around the window opening of a moving vehicle.

Accordingly for the sake of illustrating in detail how the invention disclosed herein could be applied to a frameless vehicle window, particular attention is directed to FIGS. 6-9. FIG. 6 shows a typical cross section of the roof area of a conventional modern automobile front window, taken in the region of the top of the window aperture showing how the window glass when raised, seats against the window aperture to prevent the ingress/egress of either air or water. Thus the top of the window 14 in FIG. 6, in its uppermost closed position, abuts against the weather stripping material 21 fixedly attached in a recessed area 20 of the roof structure 22. Since the cross sectional view in FIG. 6 represents the typical roof structure window aperture of a vehicle having frameless windows, the recessed area 20 and weather stripping material 21 generally only extends from the lower front edge of the window aperture up along the inclined front portion and back along the substantially horizontal upper portion thereof. Of course, should the vehicle be in the form of a pillared hardtop, the recess 20 and weather stripping 21 would also extend down along the substantially vertical rear edge of the window aperture. However, for the purposes of the present invention, only the inclined front portion of the window aperture and the horizontally disposed upper portion are deemed important. In this regard, the cross sectional view in FIG. 7 serves to illustrate how the teachings of the present invention could be incorporated into the present style frameless window aperture as manufactured. As in FIG. 6, FIG. 7 is a cross section of the roof area of an automobile front window, taken in the region of the top of the window aperture, but showing how the present invention would be applied. Thus for the purpose of providing the features of the present invention on vehicle front windows as manufactured, the recessed area 23 would be made larger than normal at the top of the window aperture as shown in FIG. 7, with the larger than normal recess 23 continuing along the inclined front portion of the window aperture except that, in the region near the lower front edge of the window aperture, where the conventional quarter vent would have been located, the recessed area would be reduced back to its normal size substantially as shown in FIG. 6. Similarly, the weather stripping material 21 would follow the same trend, being larger than normal at the top of the window aperture and along a portion of the inclined front, but of normal size in the region the quarter vent window would have occupied. Accordingly, with the vehicle front window aperture as manufactured being modified in accordance with the present invention, the operator of the vehicle could uncover a ventilating slot at the lower front edge of the window aperture while maintaining a seal around the rest of the window simply by lowering the window 14 slightly in the window aperture. Thus for the embodiment of the present invention illustrated in FIGS. 6 and 7, the principles of the invention are achieved by altering the design of the current style front window apertures without providing an accessory add on unit.

FIGS. 8 and 9 are cross sectional views taken in substantially the same place as described for FIGS. 6 and 7, but showing the invention herein in the form of an accessory device and as applied to the window aperture of a vehicle having frameless windows. For the sake of a better understanding of FIGS. 8 and 9, attention should be directed to the illustration of the flanged extension member 15 shown in FIG. 3. Accordingly, the flange extension element 15 shown in FIG. 3 is seen to comprise a device consisting of two angularly related sections 17 and 18. FIG. 8 shows how the flange element 15 is arranged and attached in the recessed area 20 of the vehicle roof 22. Of course, different vehicles would require different flange elements, however, for a basic understanding of the present invention, it may be seen in FIG. 8 that the flange extension 15 is shaped so as to fit snugly into the recess 20 after removal of the weather stripping material 21. Obviously, the weather stripping could be left in place as shown in FIG. 6, but additional weather stripping would then have to be added to the opposite side of the flange element 15 as shown at 21' in FIG. 8. The flange element is retained in position in the recess 20 by any desired means, but in the specific embodiment shown, a plurality of screws 24 are used which are threaded through the holes 19 of the flange extension 18. Consequently, keeping in mind the shape of the flange extension element section 17, it should be clear that with the window 14 partially lowered as shown in FIG. 8, the slotted portion 16 of section 17 will be uncovered to provide the ventilating slot feature of the present invention. FIG. 9 shows a modified form of the flange element 15 disclosed in detail in FIG. 3 and as applied to the window aperture. Thus in the FIG. 9 embodiment, the flange extension 18 includes a further extension at 25 which forms a water collecting trough. The embodiment shown in FIG. 9 would function in the same manner as the flange element 15 of FIG. 8 to produce the desired ventilating slot, however the FIG. 9 embodiment would find particular utility on window openings which have no provision for gutters, or in lieu of the existing gutter devices. Accordingly, even though the invention has been fully disclosed herein as applied to the front door window of an automobile, it should be understood that the invention is not so limited, since obviously the flange element disclosed would be readily adaptable to windows in other vehicles. In addition, while only several examples of the invention herein have been described in detail, it should be apparent that minor changes in the details disclosed may become apparent to others skilled in the art without departing from the spirit and scope of the invention as defined in the appended claims.

I claim:

1. In a ventilating apparatus for a vehicle, the combination of a window opening formed in the side wall and a part of the roof area of said vehicle said window opening having a generally horizontally disposed top portion and a rearwardly inclined front portion, a ventless window member of substantially the same shape and size as said window opening, and means for selectively changing the vertical position of said window member within said window opening, the improvement comprising a flange extension for said window opening and located on the inside of said window opening for sealing the window member within said window opening, said flange extension having a primary width along the top portion and the upper part of the rearwardly inclined front portion thereof which reduces the apparent size of said window opening and a secondary width of a smaller dimension than said primary width along the lower part of the rearwardly inclined front portion there, which secondary width provides a ventilating slot at the lower front edge of said window opening when the window is partially lowered within said window opening while the top portion and the upper part of the rearwardly inclined front portion of said flange extension still overlaps and seals the window within the window opening.

2. The ventilating apparatus of claim 1 wherein the flange extension is an integral part of said window opening.

3. The ventilating apparatus of claim 1 wherein the flange extension comprises an accessory element attached to the inside of said window opening.

4. The ventilating apparatus of claim 4 wherein the flange extension accessory element consists of a member having two angularly related sections, the first section being attached to said window opening along both the generally horizontally disposed top portion and the rearwardly inclined front portion thereof with the second section extending into said window opening at the inside of said window opening, said second section including a reduced in width portion along the lower part of the rearwardly inclined front portion thereof which provides the ventilating slot for the lower front edge of said window opening.

5. The ventilating apparatus of claim 5 wherein the first section of said flange extension accessory element comprises a second extension in the plane thereof which projects outside the window opening and serves as a water deflector channel for said window opening.

* * * * *